Patented Sept. 21, 1943

2,329,785

UNITED STATES PATENT OFFICE 2,329,785

REFINING WAX

John W. Pool, Aspinwall, Pa., assignor to Gulf Research & Development Company, Pittsburgh, Pa., a corporation of Delaware No Drawing. Application January 23, 1941, Serial No. 375,703

5 Claims. (Cl. 196—21)

This invention relates to refining wax, and it comprises a method of decolorizing and purifying waxes which normally require excessive amounts of clay or the like for complete decolorization by contacting said wax in the substantial absence of free oxygen and water with aluminum chloride and then contacting the wax with a solid decolorizing adsorbent in limited quantity; all as more fully hereinafter set forth and as claimed.

Petroleum waxes, which can be obtained by separation from petroleum oils, are mixtures of high molecular weight paraffins; probably they are mixtures of normal and iso-paraffins containing on the order of 20 to 40 carbon atoms per molecule. On distilling crude oil the waxes are concentrated in the high boiling, lubricating fractions and it is desirable that they be removed therefrom. If allowed to remain in lubricating oils in substantial quantities, waxes interfere with the lubricating action of the oils. For example, they precipitate from the oil at low temperatures.

From the standpoint of crystalline character there are broadly two classes of petroleum waxes; namely, crystalline wax and amorphous wax. Each class, of course, may comprise more than one sub-class or variety. Thus different crystalline forms of wax may exist. Amorphous wax, despite its name, probably consists in large part, if not entirely, of microscopic crystals which are not large enough to give the wax well defined crystalline properties.

Generally it may be stated that crystalline waxes are more volatile than amorphous waxes and accordingly are concentrated more in distillates, whereas the less volatile amorphous waxes are concentrated more in residues such as long residua and cylinder stocks. In general, it may also be stated that amorphous waxes are recovered by different methods, or as different fractions in the application of a particular method, than crystalline waxes. Crystalline waxes, as is indicated by their name, crystallize readily and are accordingly readily removed from oils by chilling and filter-pressing. The filter cake which is recovered is known as "slack-wax" and is a mixture of wax and oil. This slack wax may be "sweated," by which is meant a procedure in which wax-oil mixture such as slack wax is first solidified and then warmed to cause the oil to separate from the wax. By repeated sweating, a substantially oil-free wax can be thus produced. Amorphous wax, on the other hand, since it does not crystallize easily or at all, cannot be refined by such methods. Methods such as cold settling or centrifuging from a solvent and steam or vacuum distillation are resorted to in the production and refining of amorphous wax. Because of the greater difficulty of separating amorphous wax from oil, amorphous wax generally contains more oil than commercial crystalline wax, the latter frequently containing as little as 0.05 per cent of oil, and the former generally containing around 1.0 to 10 per cent of oil.

Among the many uses which amorphous and crystalline waxes find in industry, some uses, such as in the production of wax paper and lining the insides of metal beverage containers and of bottle tops, require that the wax be free or substantially free from color and reasonably stable; that is, the wax should not darken readily on exposure.

Waxes, both crystalline and amorphous, are dark in color when produced as described above and must accordingly be given a further treatment if a colorless wax is desired. Various decolorizing methods have been employed, chiefly acid treatment followed by clay treatment or clay treatment alone. However, in the case of certain waxes these methods are open to objection. Excessive amounts of refining agent, for example clay, are necessary to fully whiten certain waxes. An extreme example is offered by black amorphous wax. About the best refining method heretofore applied to amorphous wax in the black, impure condition in which it is normally produced is clay treatment. The wax is melted and either percolated through a body of clay or otherwise contacted with the clay. By such treatment the production of a white wax requires excessive amounts of clay. The production of an amber-colored wax which meets certain commercial requirements necessitates the consumption of about one ton of clay per 20 barrels of refined wax. However, to produce a really white wax it is necessary to use about one ton of clay for each barrel of refined wax. Obviously such a clay consumption is prohibitive. Similar difficulties are experienced in refining certain crystalline waxes.

It is an object achieved by this invention to refine and decolorize more economically those waxes which have heretofore been difficult and expensive to decolorize.

It is a particular object achieved by this invention to provide a more economical method of decolorizing amorphous wax.

I have now found that waxes which are difficult to decolorize and normally require excessive amounts of decolorizing adsorbent for complete decolorization can be completely or substantially completely decolorized at a great saving in consumption of refining agents by subjecting the wax to a pre-treatment with aluminum chloride in the absence of free oxygen and water, whereby at least a substantial portion of the color imparting impurities in the wax are converted into a more readily removable form, and then contacting the wax with a solid decolorizing adsorbent, in an amount sufficient to decolorize the wax but substantially less than would be required by the adsorbent decolorizer alone without the pre-treatment with aluminum chloride.

The pre-treatment of the wax with aluminum chloride has, as stated, the effect of converting color-imparting impurities into a form more easily removable. In part this effect appears to be due to the action of the aluminum chloride in converting such impurities into a sludge, which can be partially settled out and partially adsorbed by subsequent treatment with a solid decolorizing adsorbent, but in part the effect of the aluminum chloride in reducing the consumption of solid decolorizing adsorbent also appears to be due to a conversion of color-imparting impurities into a more adsorbable form without converting them into a sludge. Whatever the nature of its action, however, it is a fact that the aluminum chloride, without itself completely decolorizing the wax, so acts upon it that much less solid decolorizing adsorbent is required to produce a white product and, moreover, its action is so marked that a great overall saving in cost of refining is effected. That is, the combined cost of aluminum chloride treatment and treatment with clay or the like is considerably less than treatment with clay or the like alone in amount sufficient to produce a white wax.

As stated above, the aluminum chloride pre-treatment results in sludge formation; it also produces some acidity in the wax, doubtless due to the formation of HCl. It is generally desirable to remove both the sludge and the acidity. Part, and normally most, of the sludge is advantageously removed by a simple settling procedure, though a more complete but more expensive removal by centrifuging may be effected. Whatever sludge remains is then removed in the course of decolorization by means of the solid adsorbent decolorizer; the latter acts to remove sludge as well as non-sludge-like color-imparting impurities. If, as is the case with clay, the adsorbent decolorizer also has the capacity of neutralizing acidity, the above-mentioned acidity in the wax will likewise be removed in the course of the decolorizing treatment. However, some solid decolorizing adsorbents, such as charcoal, do not effect neutralization. In such cases, if a neutral wax is desired, it will be necessary to neutralize the wax by other means such as by a lime or caustic alkali solution. Such neutralization advantageously precedes the treatment of the wax with the non-neutralizing decolorizing adsorbent.

Because of their neutralizing properties and their cheapness and effectiveness, filter-type clays are most advantageously used in the practice of this invention.

The procedure of my invention may be advantageously applied to all those waxes whose decolorization by prior methods has been difficult and has involved heavy consumption of refining agents. It is especially advantageously applied to amorphous waxes. These latter waxes normally require exceedingly large amounts of reagents when decolorized by prior methods but they can be fully whitened by the process of my invention by the use of quite moderate amounts of reagents. Further specific examples of waxes which may be advantageously decolorized by the procedure of my invention are ozokerite, rod wax and montan wax.

In its most advantageous form I practice the invention as follows: A suitable cut or residue containing amorphous wax is appropriately treated to produce a wax discharge containing the amorphous wax. The amorphous wax discharge is then further concentrated with respect to the wax by some suitable method, such as dissolving it in naphtha and centrifuging it. This concentrating procedure may be repeated if necessary to produce a wax having the desired oil content, even to the extent of producing an oil-free wax. Wax thus produced will be dark in color, generally brownish black.

The dark colored wax or wax concentrate thus prepared is then heated to a temperature substantially but not greatly above its melting point and it is intimately contacted at such temperature with aluminum chloride in the presence of a dry, inert atmosphere. The quantity of aluminum chloride and the length of treatment are so regulated that substantially all reactive constituents of the wax shall have reacted with the aluminum chloride to form a sludge or are otherwise put into a condition wherein they are readily removed on subsequent contact with clay. In a typical case, 7 to 8 per cent by weight of $AlCl_3$ based on the wax is sufficient, lesser amounts requiring undesirably large amounts of clay in the subsequent clay contacting step and greater amounts causing excessive sludge formation. A suitable inert atmosphere is carbon dioxide or flue gas. This atmosphere should be dry and free from substantial amounts of free oxygen. On completion of the aluminum chloride treatment, the sludge is settled out and the wax is then treated with an adsorbent clay such as fuller's earth in an amount and for a time sufficient to neutralize the wax and remove residual sludge and to produce a material of the desired degree of whiteness. This step is also advantageously carried out at an elevated temperature, generally above 200° F. and sometimes as high as 500° to 600° F., or above. If temperatures above 200° F. are employed it is advantageous also to employ an inert atmosphere during the clay contact period, but if lower temperatures are employed this is not as important. Examples of suitable inert atmospheres for the clay contacting step are carbon dioxide and flue gas. Steam may also be used in this step, since steam is not reactive with clay.

Wax thus treated is white or nearly white, depending upon the extent of treatment, and the cost of production is very greatly reduced.

The method of my invention may be practiced in other ways than that described above. The blanketing gas employed in the aluminum chloride treatment may be any gas which is inert with regard to the wax and the aluminum chloride; primarily it should be dry and free from substantial amounts of free oxygen. Free oxygen is objectionable because it promotes color formation and nullifies the effect of the aluminum chloride. Also, if oxygen is allowed to be present, more clay is required in the final step of refining. Water in vapor or condensed form is to be excluded, because it destroys the aluminum chloride. Although carbon dioxide and flue gas are the cheapest of the inert gases which may be used, they may be replaced by nitrogen, or other inert gases. A vacuum, if high enough, may be used in place of an inert gas, but such procedure is not as economical as using an inert gas.

As has been stated above, when the aluminum chloride treated wax is contacted with clay or other absorbent decolorizing agent at temperatures above 200° F., it is desirable to exclude free oxygen. This may be accomplished, as in the case of the aluminum chloride pre-treatment, by the use of an inert gas such as carbon dioxide, flue gas, or nitrogen, or by using a vacuum. Steam may also be used since steam is not reactive with clay.

Besides adsorbent clays, other examples of suitable adsorbent decolorizers are activated carbon, activated alumina, and the like.

The following specific example will serve to illustrate further the practice and advantages of my invention.

A mixed base long residuum petroleum oil of viscosity (S. U. V.) 92 to 94 at 210° F., which had been given a multi-sol treatment to reduce its aromatic and asphaltic content, was treated as follows to produce a wax discharge: The oil was dissolved in two volumes of petroleum naphtha and the solution was chilled to −40° F. and centrifuged continuously at that temperature to remove wax which precipitated. The wax thus removed was steam distilled to drive off naphtha and any traces of light oil that may have been present.

The reduced wax discharge thus produced was a black, amorphous wax-oil mixture containing not less than 30 per cent of oil. It was dissolved in naphtha and centrifuged to produce a black, high melting amorphous wax (melting point 158.6° F.) This material was filtered by percolation through clay in the proportion of 20 barrels of wax per ton of clay, thereby producing a dark amber colored amorphous wax containing 15 per cent of oil and having the following properties:

Melting point, A. S. T. M., D127–30
                        degrees Fahrenheit__ 158.4
Penetration, A. S. T. M., D217–38T:
    77° F., 150 gms., 5 secs_____ 20
    77° F., 200 gms., 5 secs_____ 51
Neutralization No_____ 0.01

The color of this product represented about the best obtainable by a clay treatment without excessive consumption of clay. It was further treated in accordance with this invention as follows:

300 parts of the above dark amber colored amorphous wax were vigorously agitated for 3 hours at 175° F. with 24 parts of technical aluminum chloride in an atmosphere of dry carbon dioxide. At the end of this period the accumulated sludge was settled out and 255 parts of wax or 85 per cent on the charge was recovered. This wax was acid in reaction and black in color. It was agitated for one-half hour with 30 parts of a 200 mesh filter clay supplied under the trade name of Super Filtrol. During this step the temperature of the mixture was maintained at 400° F. and it was protected by an atmosphere of dry carbon dioxide. The mixture was then cooled to 200° F. and separated from the clay by filtration with the help of a filter aid. 225 parts of refined wax or 75 per cent of the original charge of 300 parts of amber colored wax were recovered.

The wax thus produced was perfectly white in color. It tested as follows:

Melting point, A. S. T. M., D127–30
                        degrees Fahrenheit__ 161
Penetration, A. S. T. M.:
    D217–38T, 77° F., 150 gms., 5 secs_____ 32
    D5–25, 77° F., 200 gms., 5 secs_____ 147
Neutralization _____ 0.01

This white wax, while not absolutely stable as to color, nevertheless exhibited, for a refined amorphous wax, a very good degree of color stability.

This invention has been described with particular reference to certain embodiments and certain examples, but it is not restricted to such embodiments and examples except as defined in the appended claims.

What I claim is:

1. A process of decolorizing amorphous wax which normally requires excessive amounts of solid decolorizing adsorbent for complete decolorization, comprising contacting said wax at a temperature above its melting point but not substantially above about 275° F., in a dry, inert, oxygen free atmosphere, with aluminum chloride in an amount sufficient to convert a substantial portion of the color imparting impurities in the wax into a more readily removable form, removing sludge resulting from the aluminum chloride treatment, and then contacting the wax with adsorbent clay in an amount sufficient to remove residual sludge from, neutralize and decolorize the wax but substantially less than would be required if adsorbent clay were used without the aluminum chloride treatment.

2. A process of decolorizing amorphous wax which normally requires excessive amounts of solid decolorizing adsorbent for complete decolorization, comprising contacting said wax at a temperature above its melting point but not substantially above about 275° F., in a dry inert, oxygen free atmosphere, with aluminum chloride in an amount sufficient to convert a substantial portion of the color imparting impurities in the wax into a more readily removable form and then contacting the wax with solid decolorizing adsorbent in an amount sufficient to remove residual sludge from, neutralize and decolorize the wax but substantially less than would be required if solid decolorizing adsorbent were used without the aluminum chloride treatment.

3. A process as defined in claim 2 wherein said dry initial oxygen free atmosphere consists of an atmosphere of nitrogen.

4. A process as defined in claim 2 wherein said dry initial oxygen free atmosphere consists of an atmosphere of carbon dioxide.

5. A process as defined in claim 2 wherein said dry initial oxygen free atmosphere consists of an atmosphere of flue gas.

JOHN W. POOL.